(12) United States Patent
Miguel et al.

(10) Patent No.: US 10,546,141 B2
(45) Date of Patent: Jan. 28, 2020

(54) NETWORK SYSTEM, AND METHODS OF ENCRYPTING DATA, DECRYPTING ENCRYPTED DATA IN THE SAME

(71) Applicant: AGENCY FOR SCIENCE, TECHNOLOGY AND RESEARCH, Singapore (SG)

(72) Inventors: Rodel Miguel, Singapore (SG); Khin Mi Mi Aung, Singapore (SG); Sivaraman Sundaram, Singapore (SG); Shuqin Ren, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 151 days.

(21) Appl. No.: 15/573,833

(22) PCT Filed: May 6, 2016

(86) PCT No.: PCT/SG2016/050215
§ 371 (c)(1),
(2) Date: Nov. 13, 2017

(87) PCT Pub. No.: WO2016/182509
PCT Pub. Date: Nov. 17, 2016

(65) Prior Publication Data
US 2018/0260576 A1    Sep. 13, 2018

(30) Foreign Application Priority Data

May 13, 2015  (SG) ............................ 10201503778Q

(51) Int. Cl.
*G06F 21/62* (2013.01)
*H04L 9/14* (2006.01)
(Continued)

(52) U.S. Cl.
CPC ............ *G06F 21/62* (2013.01); *G06F 21/602* (2013.01); *H04L 9/008* (2013.01); *H04L 9/0825* (2013.01);
(Continued)

(58) Field of Classification Search
CPC ........................................................ H04L 9/008
See application file for complete search history.

(56) References Cited

U.S. PATENT DOCUMENTS

2006/0085651 A1* 4/2006 Staddon .............. G06F 21/6227
                                                     713/193
2013/0247230 A1    9/2013 Parann-Nissany et al.
(Continued)

OTHER PUBLICATIONS

"Homomorphic encryption—Wikipedia", 9 pages, printed Jun. 10, 2019. (Year: 2019).*
(Continued)

*Primary Examiner* — Ponnoreay Pich
(74) *Attorney, Agent, or Firm* — Womble Bond Dickinson (US) LLP

(57) ABSTRACT

Various aspects of this disclosure provide a method of encrypting data in a network system. The method may include generating within a trusted network of the network system an associated private key based on an attribute associated with an user, a homomorphically encrypted associated private key based on the associated private key via homomorphic encryption, and a homomorphic key pair. The method may also include transmitting the homomorphically encrypted associated private key from the trusted network to a non-trusted network of the network system. The method may further include generating within the trusted network encrypted data based on said data, and a homomorphically and attribute based encrypted control key. The method may further include transmitting the encrypted data, and the
(Continued)

homomorphically and attribute based encrypted control key, from the trusted network to the non-trusted network.

20 Claims, 13 Drawing Sheets

(51) Int. Cl.
    *G06F 21/60*     (2013.01)
    *H04L 29/06*     (2006.01)
    *H04L 9/00*     (2006.01)
    *H04L 9/08*     (2006.01)

(52) U.S. Cl.
    CPC .............. *H04L 9/0861* (2013.01); *H04L 9/14* (2013.01); *H04L 63/0471* (2013.01); *H04L 63/06* (2013.01); *G06F 2221/2107* (2013.01); *H04L 2463/062* (2013.01)

(56) References Cited

U.S. PATENT DOCUMENTS

| | | | |
|---|---|---|---|
| 2013/0254558 A1 | 9/2013 | Bogorad | |
| 2013/0339722 A1* | 12/2013 | Krendelev | H04L 9/008 713/150 |
| 2014/0079221 A1 | 3/2014 | McCallum et al. | |
| 2014/0233731 A1* | 8/2014 | Naccache | H04L 9/008 380/44 |
| 2014/0270178 A1 | 9/2014 | Kiang et al. | |
| 2016/0119119 A1* | 4/2016 | Calapodescu | H04L 9/30 380/30 |
| 2017/0019248 A1* | 1/2017 | Mustafa | H04L 9/008 |

OTHER PUBLICATIONS

Yang et al, "An Efficient Secret Key Homomorphic Encryption Used in Image Processing Service", 12 pages, published: May 14, 2017. (Year: 2017).*
PCT International Search Report for PCT Counterpart Application No. PCT/SG2016/050215, 4 pgs. (dated Jul. 11, 2016).
PCT Written Opinion for PCT Counterpart Application No. PCT/SG2016/050215, 5 pgs. (dated Jul. 11, 2016).
PCT International Preliminary Report on Patentability for PCT Application No. PCT/SG2016/050215, 8 pgs. (dated Feb. 26, 2017).
Elaine Barker, et al., "A Framework for Designing Cryptographic Key Management Systems," NIST Special Publication 800-130, pp. 1-112 (Aug. 31, 2013).
Mark D. Ryan, "Cloud computing security: The scientific challenge, and a survey of solutions," The Journal of Systems and Software, vol. 86, No. 9, pp. 2263-2268 (Feb. 18, 2013).

* cited by examiner

Top 5 Challenges Change With Cloud Maturity

| Place | Cloud Beginners | Cloud Focused |
|---|---|---|
| #1 | Security (31%) | Compliance (18%) |
| #2 | Compliance (30%) | Cost (17%) |
| #3 | Managing multiple cloud services (28%) | Performance (15%) |
| #4 | Integration to internal systems (28%) | Managing multiple cloud services (13%) |
| #5 | Governance / Control (26%) | Security (13%) |

*Source: RightScale 2014 State of The Cloud Report*

FIG. 1C
100c
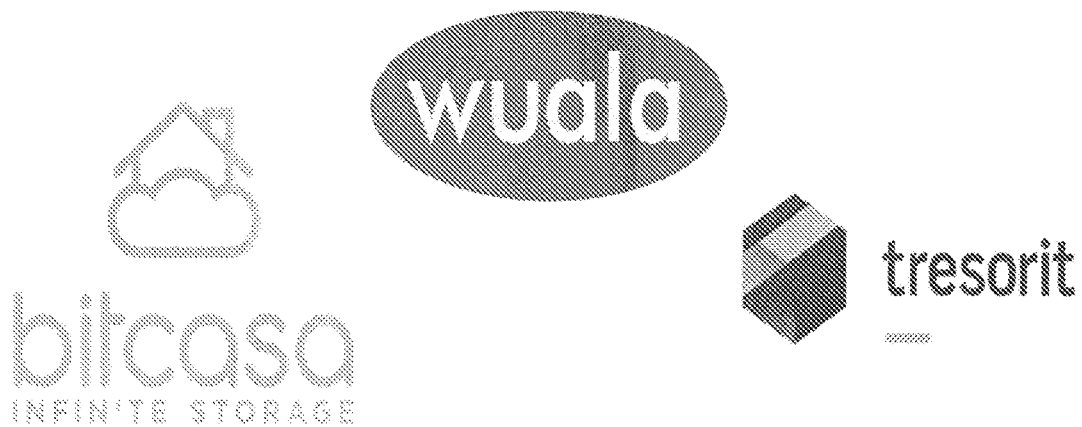
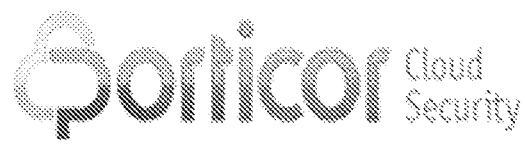

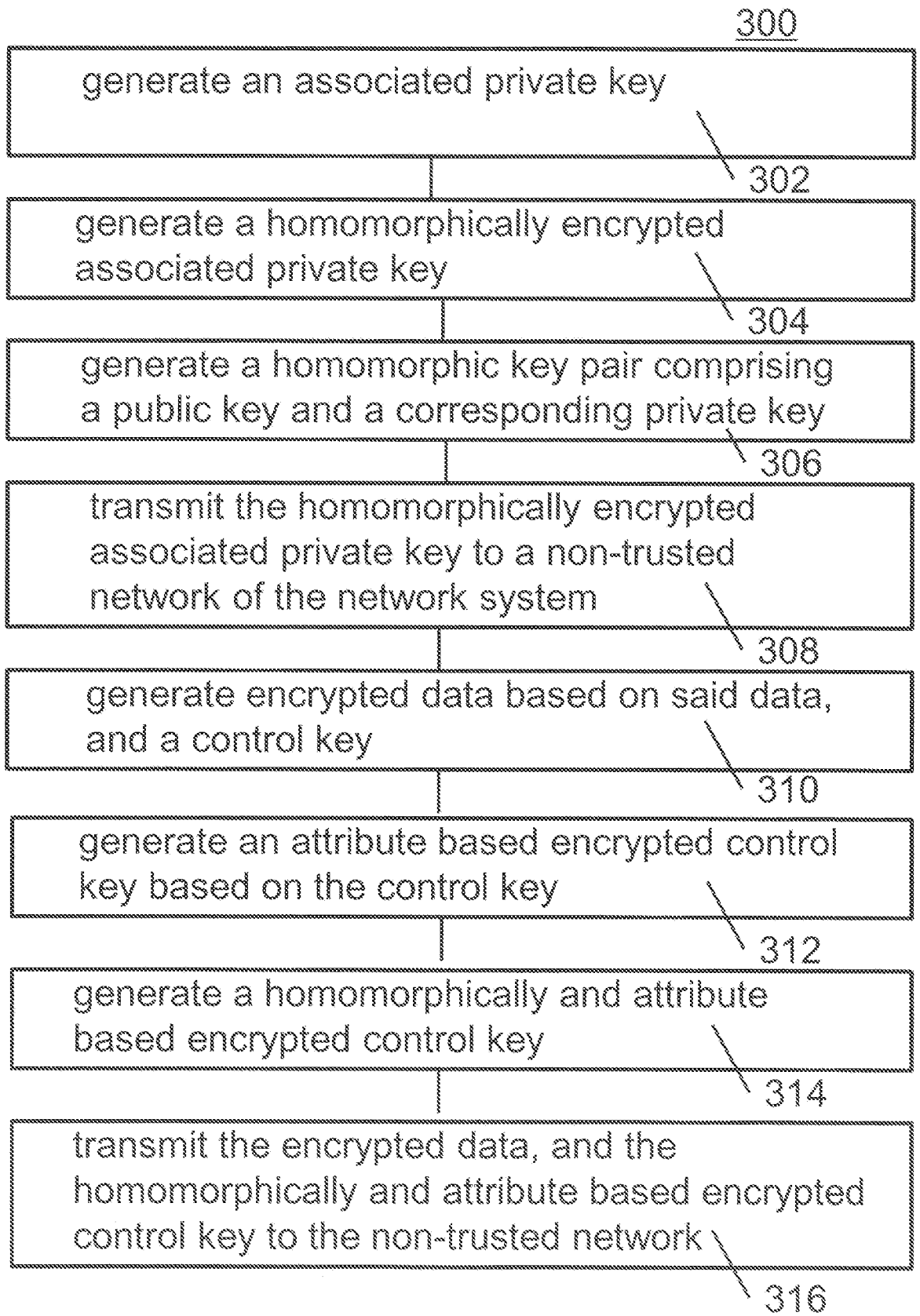

FIG. 4

400 generate a control key based on a homomorphically encrypted associated private key, a homomorphically encrypted and attribute based encrypted control key, and a corresponding private key of a homomorphic key pair
— 402 decrypt encrypted data based on the control key
— 404

FIG. 5

500 transmit a homomorphically encrypted and attribute based encrypted control key, and a encrypted data key from a non-trusted network to a trusted network

502

504 decrypt the homomorphically encrypted and attribute based encrypted control key, and the encrypted data key

506 generate a new control key different from the control key

508 generate a new encrypted data key, the new encrypted data key configured to be decrypted by the new control key

510 generate a new attribute based encrypted control key, and a new homomorphically and attribute based encrypted control key

512 transmit the new homomorphically and attribute based encrypted control key, and the new encrypted data key, to the non-trusted network

FIG. 6

600 delete a homomorphically and attribute based encrypted control key from the non-trusted network

602

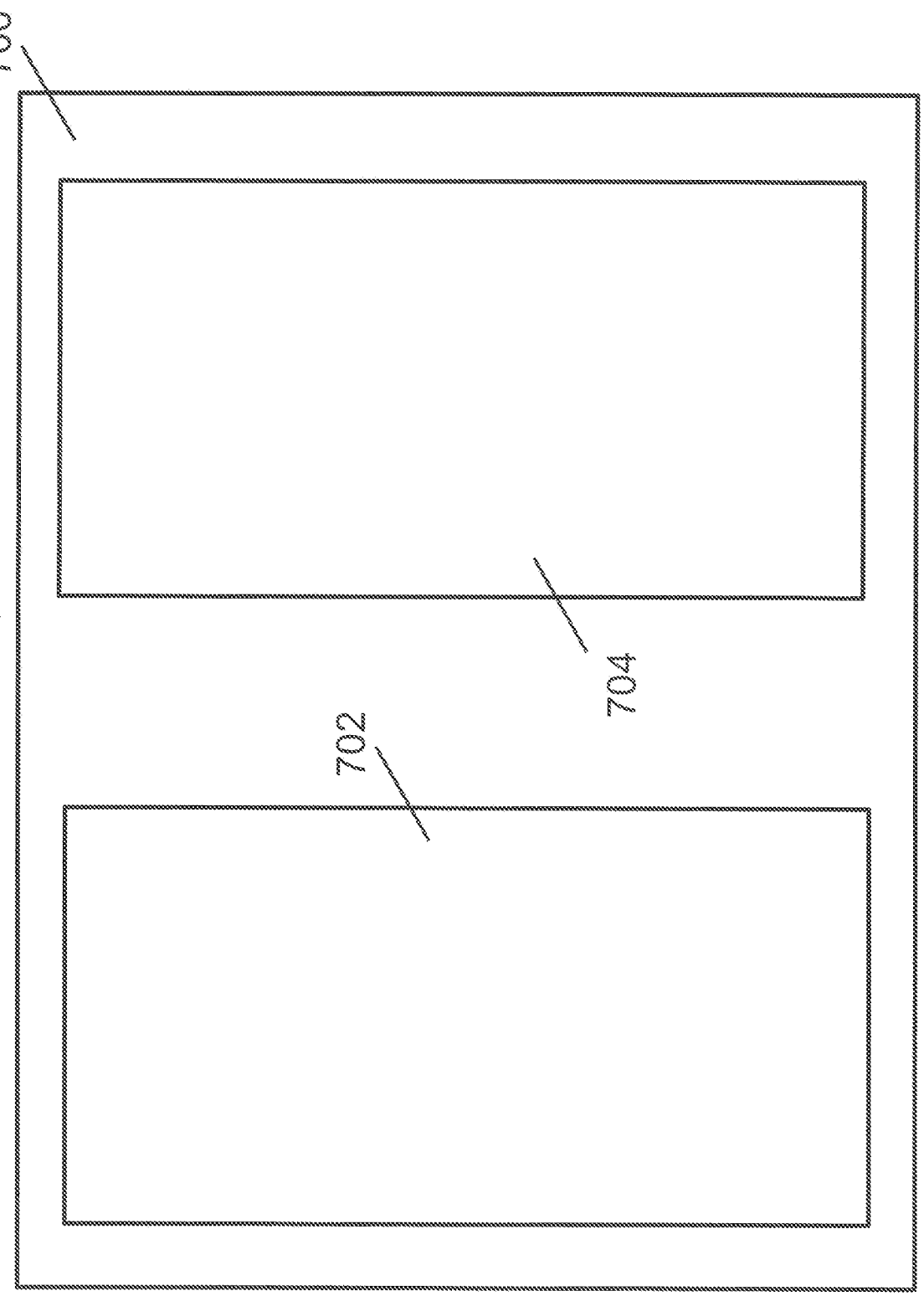

NETWORK SYSTEM, AND METHODS OF ENCRYPTING DATA, DECRYPTING ENCRYPTED DATA IN THE SAME

CROSS-REFERENCE TO RELATED APPLICATION

This patent application is a U.S. National Phase Application under 35 U.S.C. § 371 of International Application No. PCT/SG2016/050215, filed on 6 May 2016, entitled NETWORK SYSTEM, AND METHODS OF ENCRYPTING DATA, DECRYPTING ENCRYPTED DATA IN THE SAME, which claims the benefit of priority of Singapore application No. 10201503778W filed on 13 May 2015, the contents of which were incorporated by reference in the entirety for all purposes.

TECHNICAL FIELD

Various aspects of this disclosure relate to network systems, and methods of encrypting data, decrypting encrypted data in the same.

BACKGROUND

Cloud computing has gained a significant adoption in enterprises and small-to-medium businesses (SMB) in the recent years. The adoption of cloud computing in enterprises and SMBs range from cloud watchers, beginners, explorers, to cloud focused. FIG. 1A is a schematic 100a based on a report by RightScale in 2014 indicating the proportion of organizations using cloud computing. As shown in FIG. 1A, 94% of the organizations sampled use the cloud. However, only 18% of the enterprises sampled and 26% of SMB sampled are cloud focused, which means that these organizations have most of their info-communication technology (IT) workloads outsourced on the cloud. The others are cloud watches, beginners, or explorers. The primary reason why organizations do not fully adopt the cloud in their IT infrastructure is because of lack of security. FIG. 1B is a table 100b based on the report by RightScale highlighting the major challenges faced by organizations. As indicated by FIG. 1B, the major challenges for cloud computing are security and compliance.

A case study has been carried out on the financial institutions (FIs). The FI industry has been a first mover in looking at cloud services (Top 10 Gartner Client Inquiries in Cloud Computing). According to IBM Global CIO Study 2009, the FI industry adopted cloud computing faster than any other industries. Chief Information Officers (CIOs) from different industries, including FI industry, have tremendously increased their focus on cloud computing. According to IBM Financial Service Survey Whitepaper 2010, 75% of FI respondents agree that the primary barrier to public cloud adoption is security. The Gartner report indicates that the FI industry has been proactively on security.

Key concerns from FIs include identity and access management (existing enterprise auth2x framework may not extend to the cloud), data protection (making sure data is controlled and secure, solving inherent data isolation problems in multi-tenancy environments), meeting federal regulations and compliance (complying with straight privacy laws against the ability to audit encryption, security controls, and geo-locations), and trust (cloud service providers (CSPs) are required to deploy data management tools that provide visibility across the cloud to ensure the policies are being enforced, making sure that the CSPs can provide a secure architecture, e.g. secure application program interfaces (APIs) and establishing root of trust).

In summary, one of the security concerns of organizations is the management of the cryptographic keys of encrypted data when uploading to the cloud for either processing or storage. Organizations face a dilemma of keeping the cryptographic keys within the organization's control but not been able to process the data on the compute nodes of the cloud, or to trust the cloud service provider to keep the cryptographic keys safe within the service provider's infrastructure.

SUMMARY

Various aspects of this disclosure provide a method of encrypting data in a network system. The method may include generating within a trusted network of the network system an associated private key based on an attribute associated with an user. The method may further include generating within the trusted network a homomorphically encrypted associated private key based on the associated private key via homomorphic encryption. The method may additionally include generating within the trusted network a homomorphic key pair including a public key and a corresponding private key paired with the public key. The method may also include transmitting the homomorphically encrypted associated private key from the trusted network to a non-trusted network of the network system. The method may further include generating within the trusted network encrypted data based on said data, and generating within the trusted network a control key. The method may also include generating within the trusted network an attribute based encrypted control key based on the control key, via attribute based encryption based on the attribute associated with the user. The method may additionally include generating within the trusted network a homomorphically and attribute based encrypted control key based on the attribute based encrypted control key, via homomorphic encryption. The method may further include transmitting the encrypted data, and the homomorphically and attribute based encrypted control key, from the trusted network to the non-trusted network. The encrypted data may be configured to be decrypted based on the control key. Based on a request from the user, the control key may be generated within the non-trusted network based on the homomorphically encrypted associated private key, the homomorphically encrypted and attribute based encrypted control key, and the corresponding private key of the homomorphic key pair.

Various aspects of this disclosure provide a method of decrypting encrypted data in a network system. The method may include generating a control key within a non-trusted network based on a homomorphically encrypted associated private key, a homomorphically encrypted and attribute based encrypted control key, and a corresponding private key of a homomorphic key pair. The method may also include decrypting encrypted data based on the control key. The homomorphically encrypted associated private key may be generated within a trusted network of the network system based on an associated private key via homomorphic encryption, the associated private key generated based on an attribute associated with an user. The homomorphic key pair including a public key and the corresponding private key may be generated by the trusted network. The homomorphically encrypted associated private key may be transmitted from the trusted network to the non-trusted network of the network system. The encrypted data may be generated within the trusted network based on said data. The homomorphically encrypted and attribute based encrypted control key may be generated based on an attribute based encrypted control key via homomorphic encryption, the attribute based encrypted control key is generated based on a control key generated within the trusted network, via the attribute associated with the user. The encrypted data, and the homomorphically and attribute based encrypted control key, may be transmitted from the trusted network to the non-trusted network.

Various aspects of this disclosure provide a network system. The network system may include a trusted network. The network system may further include a non-trusted network system. The trusted network may be configured to generate an associated private key based on an attribute associated with an user. The trusted network may be configured to generate a homomorphically encrypted associated private key based on the associated private key via homomorphic encryption. The trusted network may be further configured to generate a homomorphic key pair including a public key and a corresponding private key paired with the public key. The trusted network may be configured to transmit the homomorphically encrypted associated private key to the non-trusted network. The trusted network may be configured to generate encrypted data based on said data. The trusted network maybe configured to generate a control key. The trusted network may be configured to generate within the trusted network an attribute based encrypted control key, based on the control key via attribute based encryption, based on the attribute associated with the user. The trusted network may be configured to generate a homomorphically and attribute based encrypted control key, based on the attribute based encrypted control key, via homomorphic encryption. The trusted network may be configured to transmit the encrypted data, and the homomorphically and attribute based encrypted control key, to the non-trusted network. The encrypted data may be configured to be decrypted based on the control key. Based on a request from the user, the non-trusted network may be configured to generate the control key based on the homomorphically encrypted associated private key, the homomorphically encrypted and attribute based encrypted control key, and the corresponding private key of the homomorphic key pair.

BRIEF DESCRIPTION OF THE DRAWINGS

The invention will be better understood with reference to the detailed description when considered in conjunction with the non-limiting examples and the accompanying drawings, in which:

FIG. 1B is a table based on the report by RightScale highlighting the major challenges faced by organizations.

FIG. 1C is an illustration of some of the commercial companies offering data security solutions for cloud computing.

FIG. 3 is a schematic illustrating a method of encrypting data in a network system according to various embodiments.

FIG. 4 is a schematic illustrating a method of decrypting encrypted data in a network system according to various embodiments.

FIG. 5 is a schematic illustrating a method of changing keys according to various embodiments.

FIG. 6 is a schematic illustrating a method of revoking a key according to various embodiments.

FIG. 7 is a schematic illustrating a network system according to various embodiments.

DETAILED DESCRIPTION

Figure 1A:
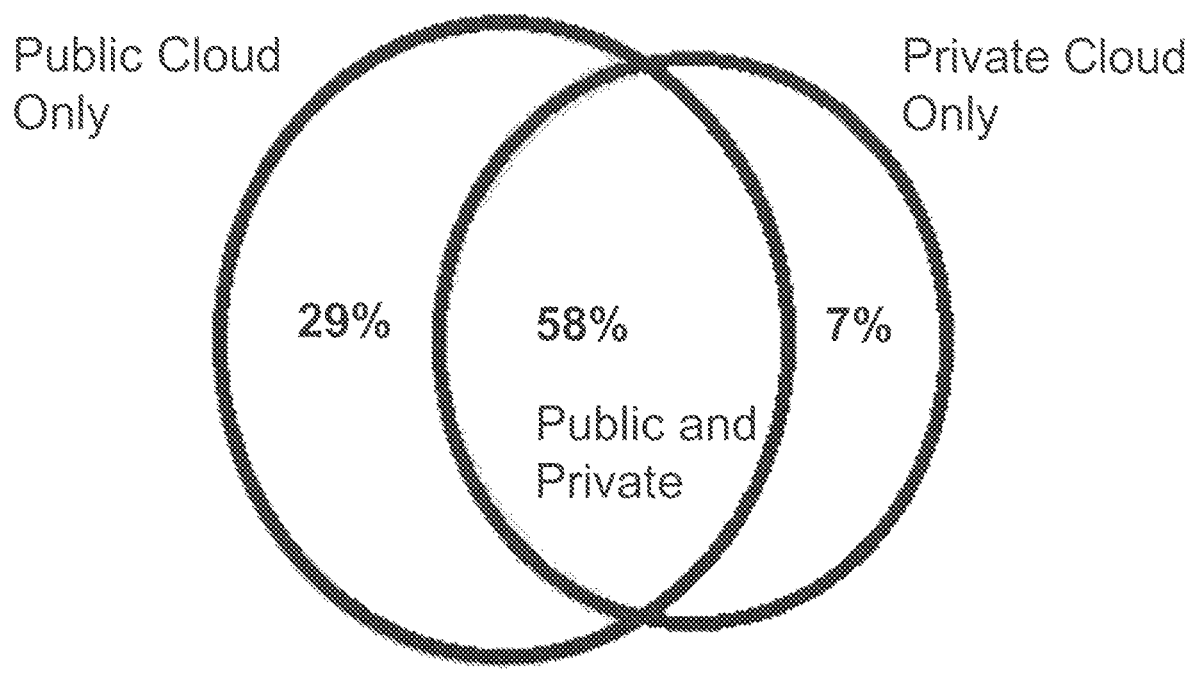
FIG. 1A is a schematic based on a report by RightScale in 2014 indicating the proportion of organizations using cloud computing.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

There is a need to protect sensitive information against unauthorized access when storing data on public cloud. Compliance requirements may be met even if data is stored on the public cloud through application of the best encryption methods to protect sensitive data. However, encryption may not be a fool-proof method because encryption keys are vulnerable to data breaches. It may be important to manage encryption keys robustly and securely. Insider attacks, multiple-tenancy, proper accounts indexing, availability, weak pass-phrases are some of the challenges when outsourcing key management functions in the cloud.

An existing security solution for having data in the cloud is in-house key management, which provides local data encryption before uploading data on the cloud storage service, However, enterprise or organization level policies and sharing is hard to implement because the keys are kept on the client or user side. Another solution is using in-cloud key management, i.e. provide data encryption on the cloud storage service provider (CSP) side. However, there is a risk that the CSP's key management nodes may be breached. Other threats include curious CSPs or inside threats within the CSPs when entrusting key management to the CSPs. A further solution may be using hosted key management, i.e. provide data encryption on trusted third party. However, putting trust on a trusted third party (TTP) or having a decreased security level on a third part is not a good solution because similar to using CSPs' services, there are threats such as curious TTPs or insider threats inside the TTPs.

Reasons why the key manager may be in the untrusted cloud may include expensive software license, operational overhead, and taking advantage of cloud computing features. An in-use key broker may be on an untrusted site to safely keep the encryption at all times, even if the keys are in use in the cloud. Protection may be provided by cryptography agnostic key management (CAKM).

Decryption or attribute based decryption may happen at the trusted platform. Alternatively, computing and decryption may be moved to the cloud, which may require the cryptographic keys to be transferred to a running instance securely, as disclosure of key may occur at this point. Another solution may be to allow a semi-trusted third party to perform decryption on the cloud instead of using the cloud instances to perform attribute based decryption.

Existing key management systems may include traditional key management systems such as RSA, Safenet, etc, or computational agnostic key management systems such as Portico. FIG. 1C is an illustration 100c of some of the commercial companies offering data security solutions for cloud computing. For in-house key management, Bitcasa, Wuala, Tresorit, etc. all provide local data encryption before uploading data on ther cloud storage service. For on-cloud key management, Amazon's CloudHSM, Gazzang, CipherCloud etc are providing data encryption on the cloud storage service provider side. For hosted key management, Trendmicro's SecureCloud and Porticor provide software as a service (Saas) that may perform key management solutions.

Various embodiments may seek to address or mitigate the various issues highlighted. Various embodiments may address or mitigate the dilemma of keeping the cryptographic keys within the organization's control but not been able to process the data on the compute nodes of the cloud, or to trust the cloud service provider to keep the cryptographic keys safe within the service provider's infrastructure.

Various embodiments may seek to create a secure and robust key management system that may be outsourced in the untrusted public cloud. Various embodiments may seek to provide an organization-level or enterprise-grade access control to data stored in the cloud. Various embodiments may seek to ensure that the keys that are stored in the cloud remain secure from curious CSPs, insider attacks, and/or other malicious users.

The network system referred to herein may refer to the info-communication technology (IT) infrastructure of an organization, such as an enterprise or a SMB. The network system may include a trusted network, which may alternatively be referred to as a trusted region or a trusted site. The network system may include a non-trusted network, which may alternatively be referred to as a non-trusted region or a non-trusted site.

The trusted network is a part of the network system within control by the organization, and may include infrastructure security nodes, such as firewalls, intrusion detection systems, and intrusion prevention systems. The untrusted network is a part of the network system outside of the trusted network, and may include cloud and/or other web-based service. The untrusted network may be hosted by a CSP or a TTP.

The trusted network may be connected to the non-trusted network via one or more wired connections, such as fiber optics cables, and/or telephone lines, or wireless connections, such as Wi-Fi, or a combination of wired and wireless connections.

The trusted network may include one or more computing devices. The non-trusted network may include one or more further computing devices. A computing device in the current context may refer to a server, a desktop computer, a workstation, a laptop, or any other suitable machines. When there are a plurality of computing devices within the trusted network and/or a plurality of computing devices within the non-trusted network, there may be one or more connections connected between devices in the trusted network and devices in the non-trusted network.

Attribute-based encryption is a type of public-key encryption in which the secret key of a user and the ciphertext may be dependent upon attributes (e.g. the name of the user, the position held by the user in the organization, the control access granted to the user etc.). In such a system, the decryption of a ciphertext may be possible only if the set of attributes of the user key matches the attributes of the ciphertext. In other words, attribute-based Encryption is a type of public-key encryption where the encryption of the plaintext may be dependent upon a set of attributes and rules. The decryption of the ciphertext may be based on a secret key generated based on some set of attributes that comply with the rules used to encrypt the ciphertext.

Homomorphic encryption is a form of encryption that may allow computations to be carried out on ciphertext, thus generating an encrypted result which, when decrypted, matches the result of operations performed on the plaintext. In other words, homomorphic encryption is a form of encryption which may allow computation to be done on ciphertexts, generating an encrypted result. The result, when decrypted, may reveal the result of the operations which matches the operations done on the original plaintext.

The trusted network may include two major components running in the trusted site: the Cryptography Agnostic Key Management (CAKM) Administrator and the Data Owner. The CAKM Administrator may be a software component responsible for initializing the components running on the cloud and generating the private keys for users in the system. The Data Owner may be a software component that users/applications use to upload data into the public storage systems.

The untrusted network may include three components that are working together using the public cloud: the CAKM Broker, the Compute Node, and the Data Store. The Data Store may be any public cloud object/file storage service offering. The Data Store may be the data storage of the cloud service provider that can be accessed by the Compute Node or the user. The Compute Node may be the running instance (virtual machine) in the public cloud of the application that processes the data the Data Owner uploads, and/or process/distribute the data to the users. The CAKM Broker may serve as the critical key storage and distribution node that is deployed in the cloud. The CAKM Broker may be responsible for key distribution and storage in the cloud.

Figure 2A:
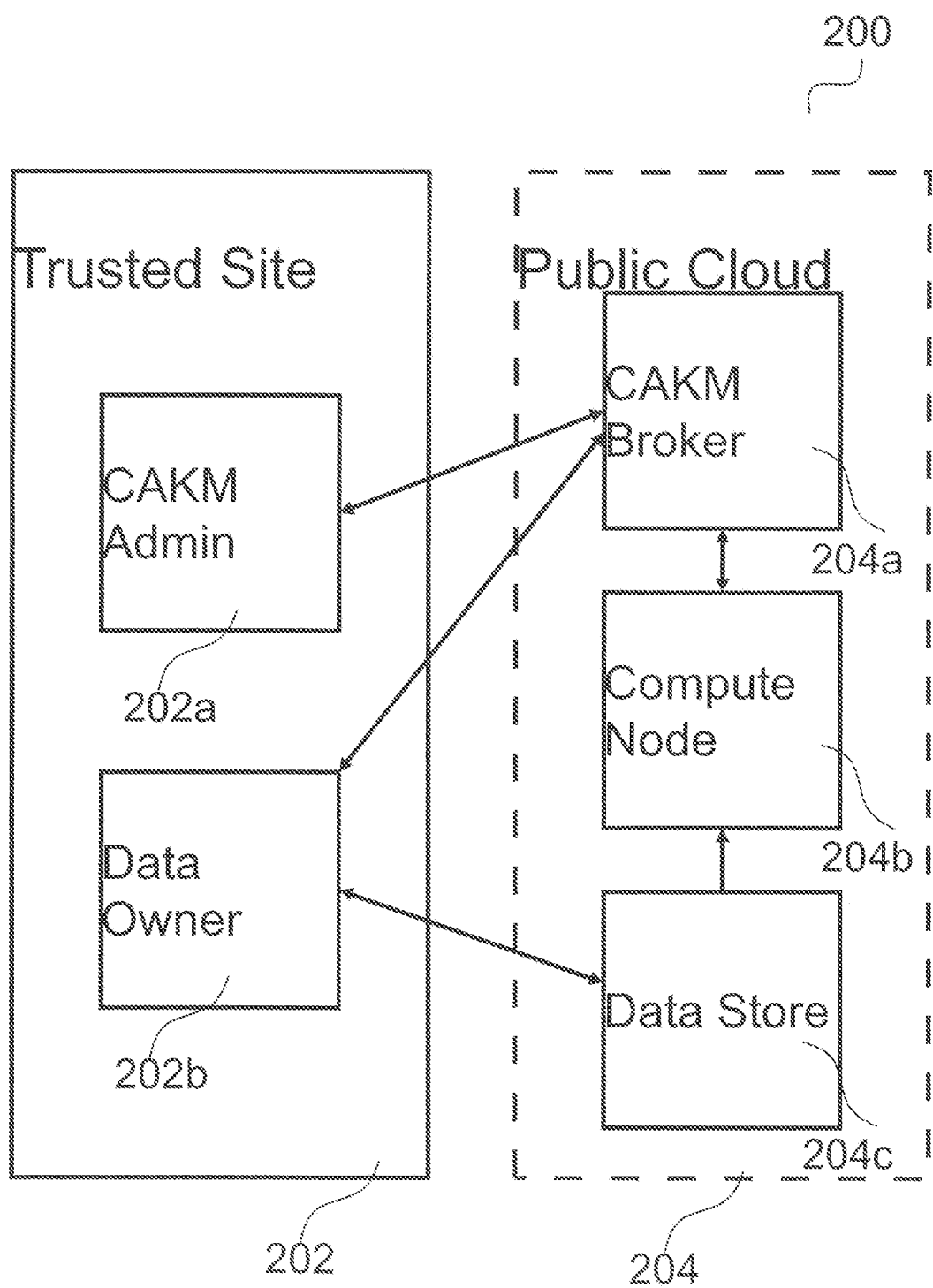
FIG. 2A is a schematic illustrating a network system according to various embodiments.

FIG. 2A is a schematic illustrating a network system 200 according to various embodiments. The network 200 may include a trusted site or a trusted network 202, and a untrusted network or a public cloud 204 connected to the trusted site or trusted network 202. The trusted site 202 may include a CAKM Administrator 202a, and a data owner 202b. The CAKM Administrator 202a may generate private keys for one or more compute nodes or one or more users. The data owner 202b may be an application on the trusted site 202 that an user used to upload data to the public cloud storage. The untrusted site 204 may include a CAKM broker 204a, a compute node 204b, and a data store 204c. The CAKM broker 204a may be responsible for key distribution and storage in the cloud. The compute node 204b may be a virtual machine that hosts application that processes or distributes the data to end users. The data store 204c may be a data storage of the cloud service provider that can be accessed by the compute node or user.

The CAKM Administrator 202a and the data owner 202b may be implemented on different computing devices or on a single computing device. The CAKM broker 204a, a compute node 204b, and a data store 204c may be implemented on different computing devices or on a single computing device. The computing devices may be connected to one another via a suitable connection, such as a wired connection, or a wireless connection or a combination of wired and wireless connections. When there is a plurality of computing devices within a trusted network or within a non-trusted network, the plurality of computing devices within the trusted network or the non-trusted network may be connected to on another via one or more suitable connections, such as wired connections, wireless connections, or a combination of wired and wireless connections.

There may be four major activities in CAKM, namely: Initialization, Data Encryption, Data Decryption, and Secure Key Change and Revocation. The Initialization process may be used to generate private keys of the users or application. The Data Encryption process may relate to encrypting and uploading the data from the trusted site onto the public cloud services. The Data Decryption process may describe the procedures to extract the data for processing on the Compute Nodes in the public cloud. The Secure Key Change and Revocation may describe the process of changing the keys.

Figure 2B:
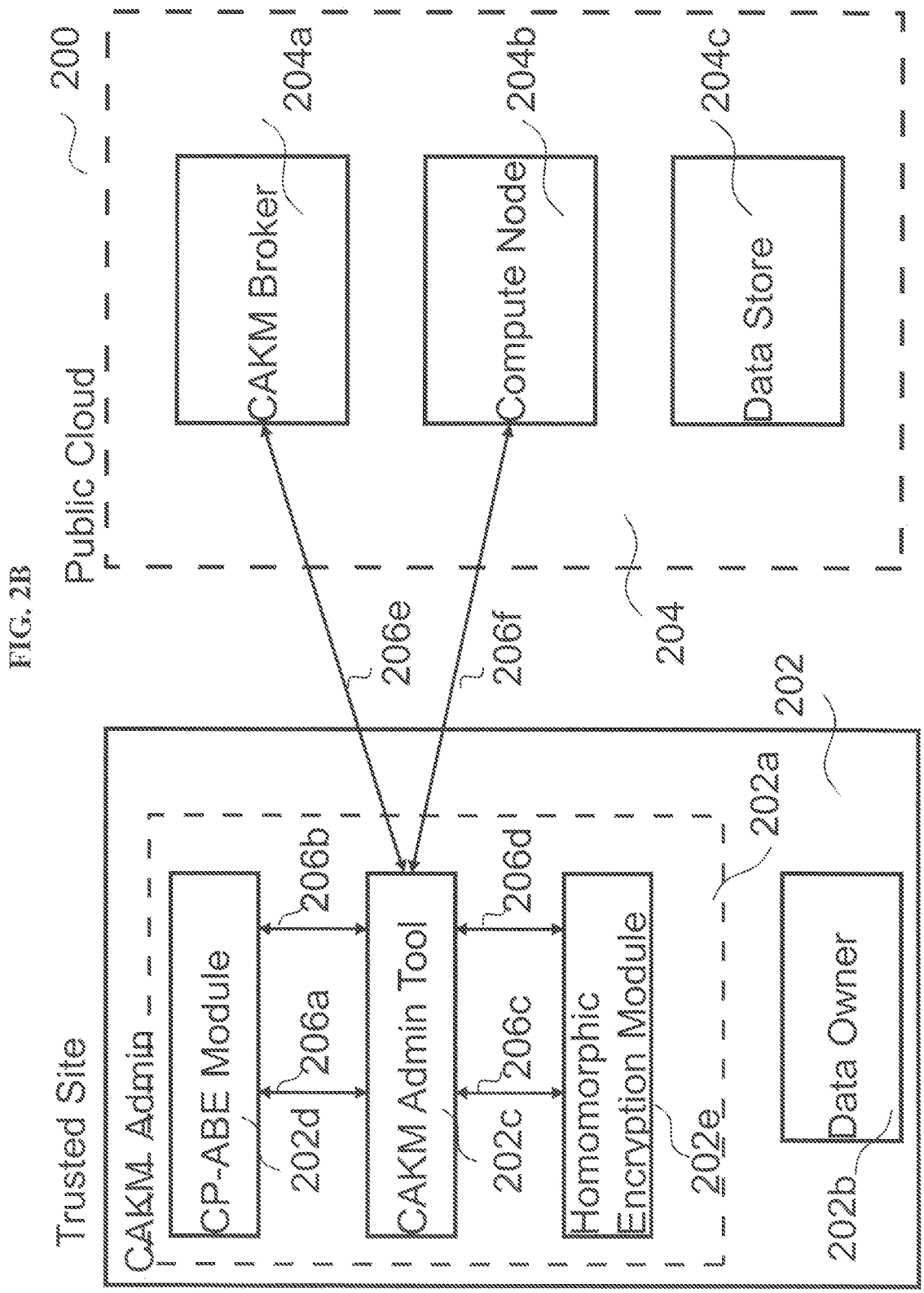
FIG. 2B is a schematic illustrating an initialization process of the network system according to various embodiments.

FIG. 2B is a schematic illustrating an initialization process of the network system 200 according to various embodiments. In the Initialization part, the CAKM 202a may provide private keys for every user in the cloud application. These private keys may be used by the CAKM to provide access control to the users of the application in running in the compute node.

The CAKM Admin component 202a may include or may use the CAKM Admin Tool 202c, Ciphertext Policy Attribute-Based Encryption (CP-ABE) library 202d, and Homomorphic Encryption (HE) library 202e. The system administrator (admin) may first trigger the initialization process of the CAKM 202a through the CAKM Admin Tool 202c. Once triggered, the CAKM Admin Tool 202c may generate a Master Key by accessing the APIs of the CP-ABE library 202d, which may be used as a base for the future user keys that are generated by the trusted network 202. As indicated in 206a, the trusted network 202 or CAKM Admin Tool 202c may send a request to the CP-ABE library 202d, which may then in response to the request, generate the master key, and transmit the master key to the CAKM Admin tool 202c.

The trusted network 202 or CAKM Admin Tool 202c may generate individual private keys for each user. The private key may be referred herein as $K_{abe}$. These individual private keys may be assigned by the CAKM Admin Tool 202c to the users of the system, and may be based on the roles and attributes of each particular user. As indicated in 206b, the CAKM Admin Tool 202c may transmit a request to the CP-ABE library 202d, which may in response to the request, generate a private key for a particular user or each user. The CP-ABE library may then transmit the private key or keys to the CAKM Admin Tool 202c.

The trusted network 202 or CAKM Admin Tool 202c may generate a homomorphic public key pair ($K_{pub}$, $K_{priv}$). $K_{abe}$ and $K_{priv}$ may be unrelated keys. $K_{abe}$ may be a key assigned to an user, while $K_{priv}$ may be part of the key pair ($K_{pub}$, $K_{priv}$) used to encrypt ($K_{abe}$) before sending to the CAKM broker 204a (as described later). As shown in 206c the CAKM Admin Tool 202c may transmit a request to the Homomorphic Encryption Tool 202e, which may in response to the request, generate the homomorphic public key pair ($K_{pub}$, $K_{priv}$). The Homomorphic Encryption Tool 202e may then transmit the homomorphic public key pair ($K_{pub}$, $K_{priv}$) to the CAKM Admin Tool 202c.

The trusted network 202 or CAKM Admin Tool 202c may conduct homomorphic encryption of the individual private keys that was generated in 206b. The trusted network 202 may use the public key that was generated in 202c to encrypt the private keys $HE_{Kpub}(K_{abe})$. For avoidance of doubt, using a key to encrypt content may refer to encrypting the content so that the encrypted content may subsequently be decrypted by the key. $K_{abe}$ may be encrypted to make sure that there is no leak of the user's private keys ($K_{abe}$) that may happen when $K_{abe}$ is subsequently sent to the CAKM Broker on the non-trusted network 204 (as described later). The homomorphic key ($HE_{kpub}$) may be used to encrypt the user's private key ($K_{abe}$), so $K_{abe}$ may be distributed to the compute node 204b for subsequently decrypting the user's data (as described later). As shown in 206d, the CAKM Admin Tool 202d may transmit a request to the Homomorphic Encryption Tool 202e. The public key $K_{pub}$ and the private key $K_{abe}$ may be transmitted with the request. The Homomorphic Encryption Tool 202e may, in response to the request, generate the homomorphically encrypted private key $HE_{Kpub}(K_{abe})$, and may transmit the homomorphically encrypted private key $HE_{Kpub}(K_{abe})$ to the CAKM Admin Tool 202d.

The trusted network 202 or CAKM Admin Tool 202c may, in 206e, send the homomorphically encrypted keys, e.g. through a secure communications channel, to the CAKM Broker 204a of the public cloud 204 for storage and distribution. The secure communications channel may be created using a well-established Secure Sockets Layer/Transport Layer Security (SSL/TLS) protocol.

The trusted network 202 or CAKM Admin Tool 202c may, in 206f, send the homomorphic public key pair to the Compute Node 204b (where the application may be running), e.g. through a secure communications channel. 206e may occur before, concurrently with, or after 206f. Another option for this step is to have public cloud 204 create the Compute Node 204b with pre-installed public key pair, that is identical to ($K_{pub}$, $K_{priv}$), which may be used for homomorphic decryption.

Figure 2C:
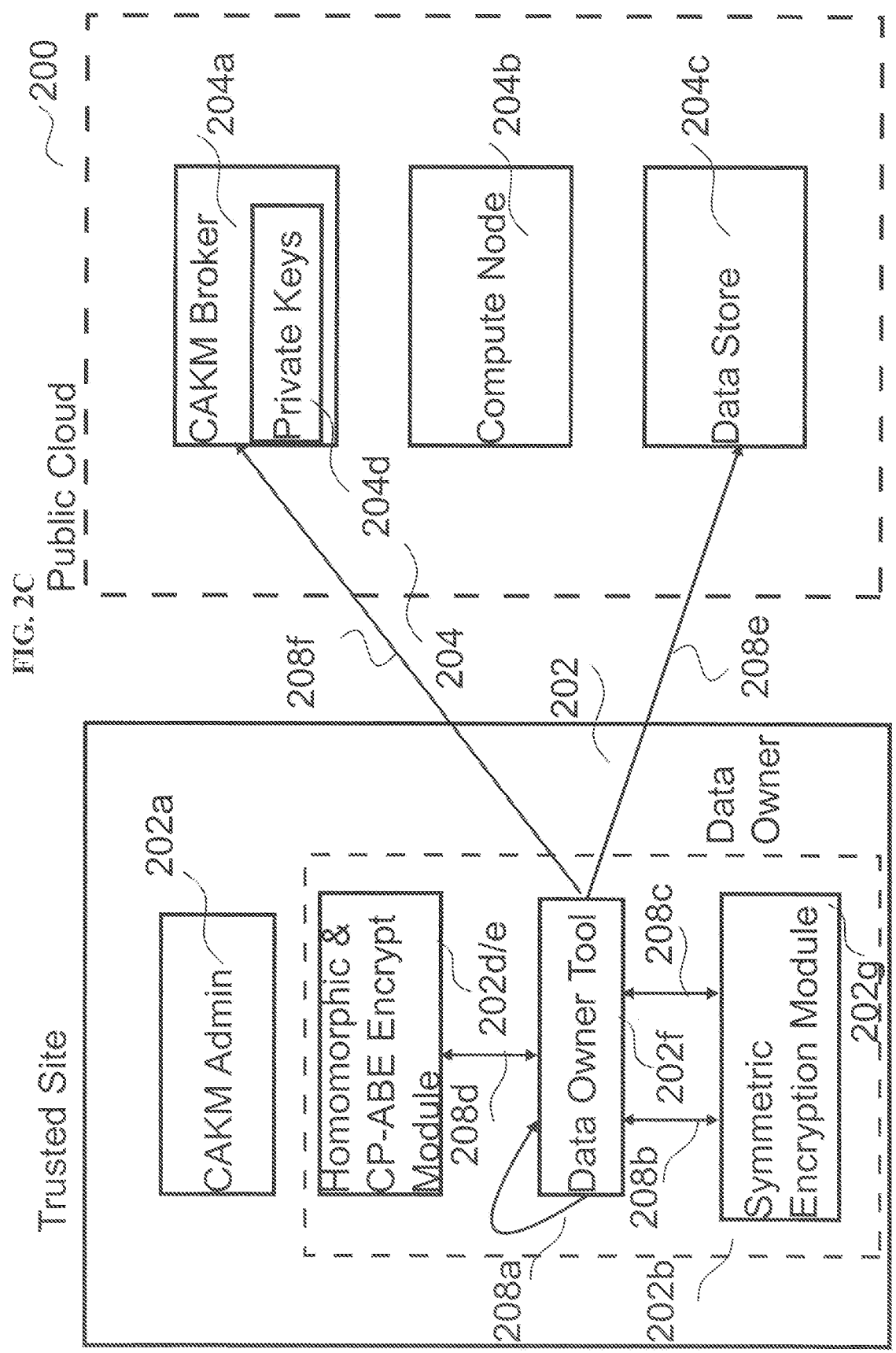
FIG. 2C is a schematic illustrating an encryption process of the network system according to various embodiments.

FIG. 2C is a schematic illustrating an encryption process of the network system 200 according to various embodiments.

The Data Encryption process is where the content/data owner may decide to share his content to the cloud for processing.

The process of Data Encryption may make use of the Data Owner component 202b of the Trusted Site 202. The Data Owner component may make use of the same CP-ABE module 202d, and HE module 202e, used in the Initialization process and any secure symmetric encryption algorithm 202g (AES-256 being the latest secure and efficient symmetric encryption algorithm). The first process 208a that the system may conduct is to generate two randomly generated keys, the data key and the control key ($K_d$, $K_c$).

Using symmetric encryption algorithm 202g, the data or content may be encrypted using the data key $K_d$ in 208b. The notation $E_{Kd}(Data)$ may be used for the encrypted data. As indicated by 208b, the Data Owner Tool 202f may transmit a request to the Symmetric Encryption Module 202g with the data or content and data key $K_d$, and the Symmetric Encryption Module 202g may, in response to the request, transmit the encrypted data $E_{Kd}(Data)$ back to the Data Owner Tool 202f.

Using symmetric encryption algorithm 202g, the data key may be encrypted using the control key $K_c$ in 208c. The notation $E_{Kc}(K_d)$ may be used for the encrypted data key. As indicated by 208c, the Data Owner Tool 202f may transmit a request to the Symmetric Encryption Module 202g with the data key $K_d$ and the control key $K_c$, and the Symmetric Encryption Module 202g may, in response to the request, transmit the encrypted data key $E_{Kc}(K_d)$ back to the Data Owner Tool 202f.

Using CP-ABE 202d, the control key may be encrypted with the attributes the data owner wants on who would be able to process/use the data that has been encrypted in 208b. The encrypted control key may be homomorphically encrypted with the HE public key used in 206d of Initialization. The attribute based and homographic encryption is denoted by 208d. The output of this step may be denoted by $HE_{Kpub}(ABE(K_c))$. The Data Owner Tool 202f may transmit a request to the CP-ABE module 202d with the control key, and the CP-ABE module may, in response to the request, generate an attribute based encrypted control key. In various embodiments, the attribute based encrypted control key may be transmitted directly to the homomorphic encryption module 202e for homographic encryption to generate $HE_{Kpub}(ABE(K_c))$, which may then be transmitted back to the Data Owner Tool 201f. The public key required for the homographic encryption may be transmitted separately from the Data Owner Tool 202f or may be already residing in homomorphic encryption module 202e. In various other embodiments, the attribute based encrypted control key may be transmitted from the CP-ABE module 202d to the Data Owner Tool 201f. When the attribute based encrypted control key is transmitted back to the Data Owner Tool 202f, the Data Owner Tool 202f may transmit another request with the attribute based encrypted control key to the homomorphic encryption module 202e. The public key may be transmitted together with the attribute based encrypted control key or may already reside in the homomorphic encryption module 202e. The homomorphic encryption module 202e may, in response to the request, generate $HE_{Kpub}(ABE(K_c))$ and transmit $HE_{Kpub}(ABE(K_c))$ to the Data Owner Tool 202f.

The encrypted data $E_{kd}(Data)$ and encrypted data key $E_{Kc}(K_d)$ may be uploaded by the Data Owner Tool 202f to the outsourced data storage 204c in the cloud 204 using a secure communication channel in 208e. The encrypted data may be denoted as "Encrypted Data" and the encrypted datakey may be denoted as "Encrypted Datakey".

The encrypted control key $HE_{Kpub}(ABE(K_c))$ may be uploaded by the Data Owner Tool 202f to the CAKM Broker 204a running in the cloud 204 using a secure communication channel in 208f. The encrypted control key $HE_{Kpub}(ABE(K_c))$ may be stored in the CAKM Broker 204a, and may be subsequently used by the CAKM Broker 204a to provide access control to the encrypted data. The encrypted control key $HE_{Kpub}(ABE(K_c))$ may be denoted as "KeyEncKey Keys". The CAKM Broker 204a may already include key $HE_{Kpub}(K_{abe})$ 204d (denoted as "Private Keys"), which may be stored in the initialization process. 208e may occur before, concurrently with, or after 208f.

Figure 2D:
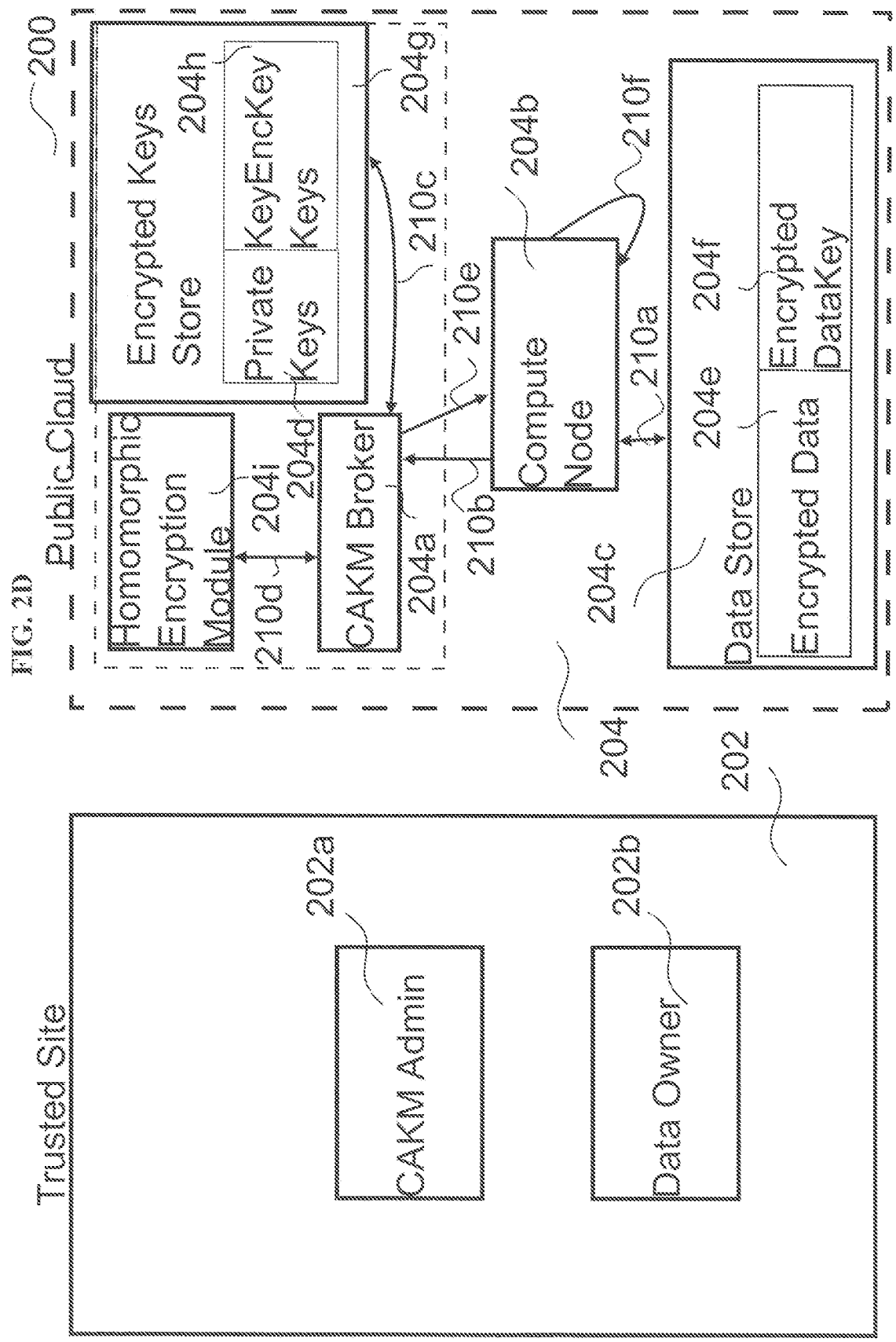
FIG. 2D is a schematic illustrating a decryption process of the network system according to various embodiments.

FIG. 2D is a schematic illustrating a decryption process of the network system 200 according to various embodiments.

The Data Decryption process may allow Compute Node 204b in the public cloud 204 to process the data shared by the content owners. This may allow the CAKM Broker 204a to distribute the keys to the intended users or applications to process the encrypted data. This solution may allow for scalable key distribution because of the flexibility offered by cloud computing.

As mentioned previously, the untrusted site 204 in this system 200 may include the CAKM Broker 204a, Compute Node 204b, and Data Store 204c. The applications may run on the Compute Node 204b and may be triggered by users who need to process the data shared on the cloud 204. As shown in 210a, The Compute Node 204b may first get the encrypted data $E_{Kd}(Data)$ 204e and encrypted data key $E_{Kc}(K_d)$ 204f from the Data Store 204c. The Compute Node 204b may transmit a request and the Data Store 204c may, in response to the request, transmit the encrypted data $E_{Kd}(Data)$ 204e and encrypted data key $E_{Kc}(K_d)$ 204f.

The Compute Node 204b may then in 210b, request for the homomorphically encrypted control key $HE_{Kpub}(K_c)$ from the CAKM Broker 204a. The Compute Node 204b may submit $K_{pub}$ and predetermined authentication credentials along with the request. However, the CAKM Broker 204a may only keep the homomorphically encrypted attribute-based encrypted control key $HE_{Kpub}(ABE(K_c))$ 204h on its encrypted key store database 204g.

The CAKM Broker 204a may need to extract the homomorphically encrypted control key, so it may download both the homomorphically-encrypted attribute-based encrypted control key $HE_{Kpub}(ABE(K_c))$ 204h and the homomorphically-encrypted attribute based encryption key $HE_{Kpub}(Kabe)$ 204d from the encrypted key store 204g in 210c for the specific user to process the requested $HE_{kpub}(K_c)$. The CAKM Broker 204a may transmit a request to the key store 204g and the key store 204g may, in response to the request, transmit $HE_{Kpub}(ABE(K_c))$ 204h and $HE_{Kpub}(K_{abe})$ 204d to the CAKM Broker 204a. Before transmitting the request to the key store 204g, the CAKM Broker 204a may first check the public key $K_{pub}$ and/or the authentication credentials submitted by the Compute Node 204b, and may only proceed with transmitting the request to the key store 204g only if the submitted public key and/or authentication credentials match with public key and/or credentials stored in the CAKM Broker 204a.

Using Fully Homomorphic Encryption (FHE) schemes, $HE_{Kpub}(K_c)$ may be extracted using attribute based decryption process as the evaluation function of the FHE processing. Specifically, $HE_{Kpub}(K_c)=Eval(ABD(\ ), HE_{Kpub}(K_{abe}), HE_{Kpub}(ABE(K_c)))$. ABD refers to attribution based decryption. The CAKM Broker 204a may in 210d transmit a request to the Homomorphic Encryption Module 204i with $HE_{Kpub}(K_{abe})$ and $HE_{Kpub}(ABE(K_c))$, and the Homomorphic Encryption Module 204i may, in response to the request, transmit $HE_{Kpub}(K_c)$ back to the CAKM broker 204a after evaluating the function.

The CAKM Broker 204a may in 210e send $HE_{Kpub}(K_c)$ back to the requesting Compute Node 204a for processing.

In 210f, decryption of $HE_{Kpub}(K_c)$ may be carried out using the private key $K_{priv}$ that was given to the Compute Node 204a by the CAKM Admin 202a, to extract the control key. $K_c=HD_{Kpriv}(HE_{Kpub}(K_c))$. The control key $K_c$ may be subsequently used to extract the data key and the data using the symmetric decryption algorithm.

Figure 2E:
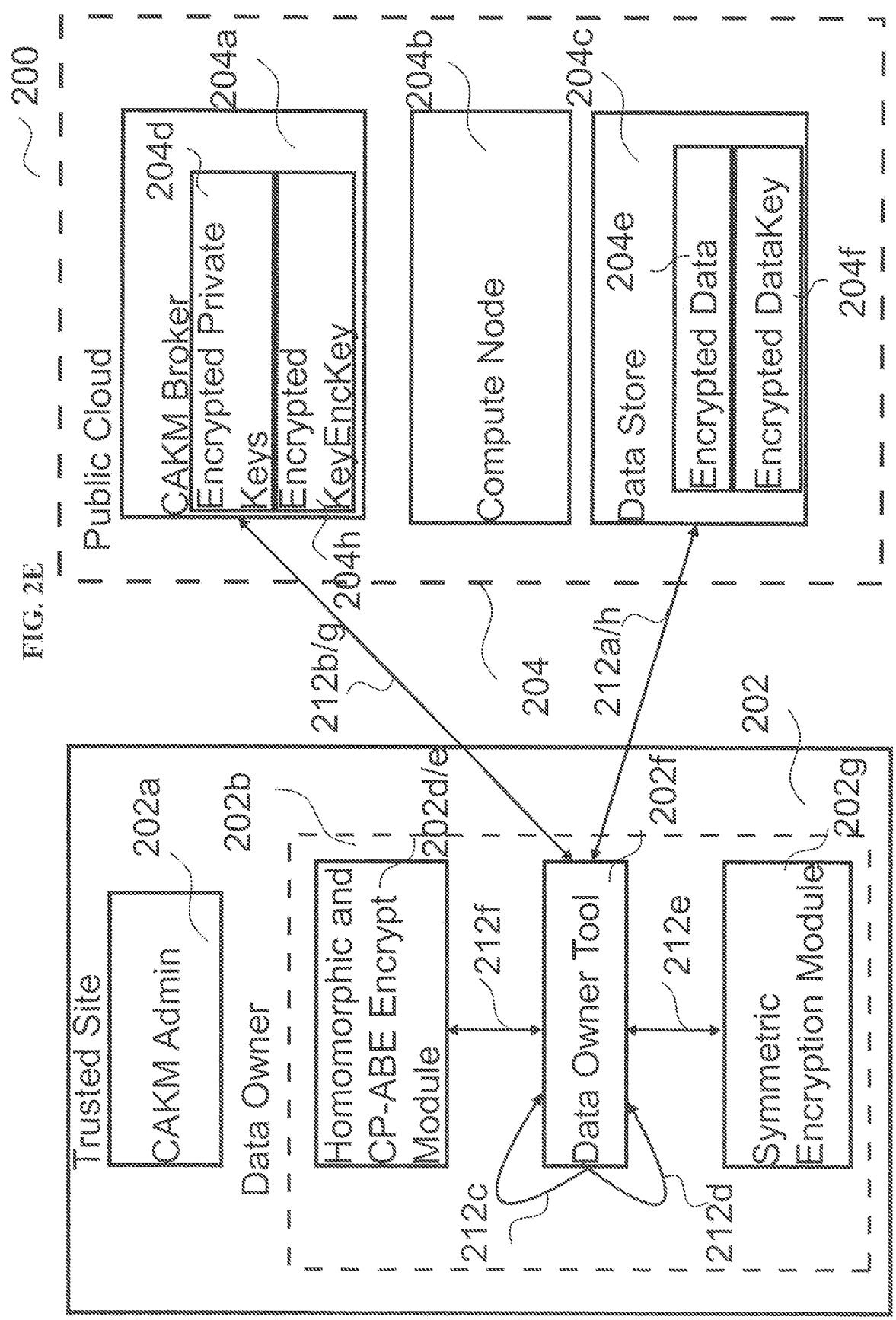
FIG. 2E is a schematic illustrating a secure key change process of the network system according to various embodiments.

FIG. 2E is a schematic illustrating a secure key change process of the network system 200 according to various embodiments.

The Secure Key Change process may be used in re-keying of encrypted data key (for more efficient security process). In this process, only the control keys may be changed. This may make the re-keying process more efficient, because only the data key needs to be re-encrypted. The rationale for this is that most adversaries may try to extract the data keys more than extracting the actual data since it is more practical to attack a smaller set of data.

First, the Data Owner tool 202f may in 212a, get the encrypted data key $E_{Kc}(K_d)$ 204f from the Data Store 204c. In various embodiments, the Data Owner tool 202f may transmit a request to the Data Store 204c, and the Data Store 204c may, in response to the request, send the encrypted data key $E_{Kc}(K_d)$ 204f to the Data Owner tool 201f. In various other embodiments, the Data Store 204c may, on a request from an user, directly transmit encrypted data key $E_{Kc}(K_d)$ 204f to the Data Owner tool 202f.

The Data Owner tool 202f may then, in 212b, get the encrypted control key $HE_{Kpub}(ABE(K_c))$ 204d from the CAKM Broker 204a. The Data Owner tool 202f may transmit a request to the CAKM Broker 204a and the CAKM Broker 204a may, in response to the request, send the encrypted control key $HE_{Kpub}(ABE(K_c))$ 204d to the Data Owner tool 201f. In various other embodiments, the CAKM Broker 204a may, on a request from an user, directly transmit encrypted control key $HE_{Kpub}(ABE(K_c))$ 204d to the Data Owner tool 202f.

212a may occur before, concurrently with, or after 212b.

The Data Owner tool 202f may then, in 212c, decrypt the data key $E_{Kc}(K_d)$ 204f and control key $HE_{Kpub}(ABE(K_c))$ on the local site 202 using the keys generated from the Initialization and Encryption processes.

A new control key Kc' may be generated in 212d.

The data key may then be encrypted with the new control key to generate $E_{Kc'}(K_d)$ in 212e. The Data Owner Tool 202f may transmit a request to the Symmetric Encryption Module 202g, and the Symmetric Encryption Module 202g may, in response to the request, generate and transmit $E_{Kc'}(K_d)$ to the Data Owner Tool 201f. The new control key $K_{c'}$ and the data key $K_d$ may be transmitted along with the request.

The control key may in 212f, be encrypted in a manner similar to 208d of the Encryption process to generate a new encrypted control key $HE_{Kpub}(ABE(K_{c'}))$. The Data Owner Tool 202f may transmit a request to the CP-ABE module 202d with the new control key $K_{c'}$, and the CP-ABE module 202d, may in response to the request, generate a new attribute based encrypted control key. In various embodiments, the new attribute based encrypted control key may be transmitted directly to the homomorphic encryption module 202e for homographic encryption to generate $HE_{Kpub}(ABE(K_{c'}))$, which may then be transmitted back to the Data Owner Tool 201f. The public key required for the homographic encryption may be transmitted separately from the Data Owner Tool 202f or may be already residing in homomorphic encryption module 202e. In various other embodiments, the new attribute based encrypted control key may be transmitted from the CP-ABE module 202d to the Data Owner Tool 201f. When the new attribute based encrypted control key is transmitted back to the Data Owner Tool 202f, the Data Owner Tool 202f may transmit another request with the new attribute based encrypted control key to the homomorphic encryption module 202e. The public key may be transmitted together with the new attribute based encrypted control key or may already reside in the homomorphic encryption module 202e. The homomorphic encryption module 202e may, in response to the request, generate $HE_{Kpub}(ABE(K_{c'}))$ and transmit $HE_{Kpub}(ABE(K_{c'}))$ to the Data Owner Tool 202f.

The Data Owner Tool 202f may, in 212g, send $HE_{Kpub}(ABE(K_{c'}))$ to the CAKM Broker 204a. The Data Owner Tool 202f may, in 212h, send $E_{Kc'}(K_d)$ to the Data Store 204c. 212g may occur before, concurrently with, or after 212h.

The Key Revocation process may be used for data retirement. The Key Revocation process only involves requesting a delete of the encrypted control or private keys from the CAKM Broker 204a.

When the data is to be retired, it may be enough for the system to remove the encrypted keys stored in the CAKM Broker 204a, even if the public cloud service provider does not really delete the encrypted data (because of replication and backup processes), there may be no data breach because the data is stored in encrypted form.

The Data Owner 202b may send a request to the CAKM Broker 204a, and the CAKM Broker 204a may, in response to the request, remove or delete the encrypted control key $HE_{Kpub}(ABE(K_c))$ 204h.

FIG. 3 is a schematic 300 illustrating a method of encrypting data in a network system according to various embodiments. The method may include, in 302, generating within a trusted network of the network system an associated private key based on an attribute associated with an user. The method may further include, in 304, generating within the trusted network a homomorphically encrypted associated private key based on the associated private key via homomorphic encryption. The method may additionally include, in 306, generating within the trusted network a homomorphic key pair including a public key and a corresponding private key paired with the public key. The method may also include, in 308, transmitting the homomorphically encrypted associated private key from the trusted network to a non-trusted network of the network system. The method may further include, in 310, generating within the trusted network encrypted data based on said data, and generating within the trusted network a control key. The method may also include, in 312, generating within the trusted network an attribute based encrypted control key based on the control key, via attribute based encryption based on the attribute associated with the user. The method may additionally include, in 314, generating within the trusted network a homomorphically and attribute based encrypted control key based on the attribute based encrypted control key, via homomorphic encryption. The method may further include, in 316, transmitting the encrypted data, and the homomorphically and attribute based encrypted control key, from the trusted network to the non-trusted network. The encrypted data may be configured to be decrypted based on the control key. Based on a request from the user, the control key may be generated within the non-trusted network based on the homomorphically encrypted associated private key, the homomorphically encrypted and attribute based encrypted control key, and the corresponding private key of the homomorphic key pair.

In other words, the method may include generating in a secure network a homomorphically encrypted associated private key, and a homomorphic key pair including a public key and a corresponding private key paired with the public key, and sending them to a non-secure network. The method may also include generating in the secure network encrypted data. A control key used in decrypting the encrypted data may be generated, and then encrypted via attribute based encryption and homomorphic encryption. The encrypted data, and homomorphically and attribute based encrypted control key may then be sent to the non-secure network. The user accessing the non-secure network may then recover the control key based on the homomorphically encrypted associated private key, the homomorphically encrypted and attribute based encrypted control key, and the corresponding private key of the homomorphic key pair, available in the non-secure network, and use the recovered control key to decrypt the encrypted data.

The associated private key based on an attribute associated with the user may be referred to as $K_{abe}$, and the homomorphically encrypted associated private key may be referred to as $HE_{Kpub}(K_{abe})$. The public key of the homomorphic key pair may be referred to as $K_{pub}$, and the corresponding private key may be referred to as $K_{priv}$.

In various embodiments, the associated private key, the homomorphically encrypted associated private key, and the homomorphic key pair may be generated in an initialization process.

The control key may be referred to as IQ, and the homomorphically and attribute based encrypted control key may be referred to as $HE_{Kpub}(ABE(K_c))$.

In various embodiments, the method may include generating within the trusted network a data key ($K_d$). The method may also include generating within the trusted network an encrypted data key ($E_{Kc}(K_d)$), the encrypted data key configured to be decrypted by the control key ($K_c$). The encrypted data ($E_{Kd}(data)$) may be configured to be decrypted by the data key ($K_d$) so that the encrypted data ($E_{Kd}(data)$) may be configured to be indirectly decrypted based on the control key ($K_c$). The method may further include transmitting the encrypted data key ($E_{Kc}(K_d)$) from the trusted network to the non-trusted network.

In various embodiments, the control key ($K_c$), the attribute based encrypted control key, the homomorphically and attribute based encrypted control key ($HE_{Kpub}(ABE(K_c))$), the encrypted data ($E_{Kd}(data)$), the data key ($K_d$), the encrypted data key ($E_{Kc}(K_d)$) may be generated in an encryption process.

In various embodiments, the homomorphic key pair ($K_{pub}$, $K_{priv}$) may be transmitted from the trusted network to the non-trusted network. In various other embodiments, a further homomorphic key pair identical to the homomorphic key pair may be generated in the non-trusted network.

In various embodiments, the homomorphic encryption may be a fully homomorphic encryption. In other words, homomorphic encryption may refer to a fully homomorphic encryption. A fully homomorphic encryption may allow for arbitrary computation on ciphertexts.

The trusted network may, upon request from a data owner (a key revocation request), perform a key revocation. The non-trusted network may, upon request from a data owner, be configured to delete the homomorphically and attribute based encrypted control key. The deletion of the homomorphically and attribute based encrypted control key may be done in the key revocation process. By deleting only the homomorphically and attribute based encrypted control key instead of the data or encrypted data, the efficiency of the security process may be improved.

The trusted network may, upon request from a data owner (a key change request), perform a key change. The trusted network may, upon request from a data owner, be configured to obtain the homomorphically and attribute based encrypted control key, and encrypted data key, from the non-trusted network. The trusted network may be further configured to decrypt the control key based on the homomorphically and attribute based encrypted control key. The trusted network may be further configured to decrypt the data key based on the encrypted data key, via the control key.

The trusted network may be further configured to generate a new control key different from the control key. The trusted network may also be configured to generate a new encrypted data key, the new encrypted data key configured to be decrypted by the new control key. The trusted network may be further configured to generate a new attribute based encrypted control key based on the new control key, via attribute based encryption based on the attribute associated with the user. The trusted network may be further configured to generate a new homomorphically and attribute based encrypted control key, based on the new attribute based encrypted control key, via homomorphic encryption. The trusted network may be further configured to transmit the new homomorphically and attribute based encrypted control key, and the new encrypted data key, to the non-trusted network.

FIG. 4 is a schematic 400 illustrating a method of decrypting encrypted data in a network system according to various embodiments. The method may include, in 402, generating a control key within a non-trusted network based on a homomorphically encrypted associated private key, a homomorphically encrypted and attribute based encrypted control key, and a corresponding private key of a homomorphic key pair. The method may also include, in 404, decrypting encrypted data based on the control key. The homomorphically encrypted associated private key may be generated within a trusted network of the network system based on an associated private key via homomorphic encryption, the associated private key generated based on an attribute associated with an user. The homomorphic key pair including a public key and the corresponding private key may be generated by the trusted network. The homomorphically encrypted associated private key may be transmitted from the trusted network to the non-trusted network of the network system. The encrypted data may be generated within the trusted network based on said data. The homomorphically encrypted and attribute based encrypted control key may be generated based on an attribute based encrypted control key via homomorphic encryption, the attribute based encrypted control key is generated based on a control key generated within the trusted network, via the attribute associated with the user. The encrypted data, and the homomorphically and attribute based encrypted control key, may be transmitted from the trusted network to the non-trusted network.

In other words, decrypting or decoding encrypted data may first include decoding or generating a control key within a non-trusted network based on a homomorphically encrypted associated private key, a homomorphically encrypted and attribute based encrypted control key, and a corresponding private key of a homomorphic key pair, followed by decrypting or decoding the encrypted data using the control key. The homomorphically encrypted associated private key, the homomorphically encrypted and attribute based encrypted control key and the homomorphic key pair may be generated within a trusted network connected to the non-trusted network.

FIG. 5 is a schematic 500 illustrating a method of changing keys according to various embodiments. The method may include, in 502, transmitting a homomorphically encrypted and attribute based encrypted control key, and an encrypted data key from a non-trusted network to a trusted network. The method may include, in 504, decrypting within the trusted network the homomorphically encrypted and attribute based encrypted control key, and the encrypted data key. The method may include, in 506, generating within the trusted network a new control key different from the control key. The method may further include, in 508, generating within the trusted network a new encrypted data key, the new encrypted data key configured to be decrypted by the new control key. The method may additionally include, in 510, generating within the trusted network a new attribute based encrypted control key based on the new control key, via attribute based encryption based on the attribute associated with the user, and generating within the trusted network a new homomorphically and attribute based encrypted control key, based on the new attribute based encrypted control key, via homomorphic encryption. The method may additionally include, in 512, transmitting the new homomorphically and attribute based encrypted control key, and the new encrypted data key, from the trusted network to the non-trusted network.

FIG. 6 is a schematic 600 illustrating a method of revoking a key according to various embodiments. The method may include, in 602, deleting a homomorphically and attribute based encrypted control key from the non-trusted network.

FIG. 7 is a schematic illustrating a network system 700 according to various embodiments. The network system 700 may include a trusted network 702. The network system 700 may further include a non-trusted network system 704. The trusted network 702 may be configured to generate an associated private key based on an attribute associated with an user. The trusted network 702 may be configured to generate a homomorphically encrypted associated private key based on the associated private key via homomorphic encryption. The trusted network 702 may be further configured to generate a homomorphic key pair including a public key and a corresponding private key paired with the public key. The trusted network 702 may be configured to transmit the homomorphically encrypted associated private key to the non-trusted network 704. The trusted network 702 may be configured to generate encrypted data based on said data. The trusted network 702 maybe configured to generate a control key. The trusted network 702 may be configured to generate within the trusted network 702 an attribute based encrypted control key, based on the control key via attribute based encryption, based on the attribute associated with the user. The trusted network 702 may be configured to generate a homomorphically and attribute based encrypted control key, based on the attribute based encrypted control key, via homomorphic encryption. The trusted network 702 may be configured to transmit the encrypted data, and the homomorphically and attribute based encrypted control key, to the non-trusted network 704. The encrypted data may be configured to be decrypted based on the control key. Based on a request from the user, the non-trusted network 704 may be configured to generate the control key based on the homomorphically encrypted associated private key, the homomorphically encrypted and attribute based encrypted control key, and the corresponding private key of the homomorphic key pair.

In other words, a network system 700 with a secure portion 702 and a non-secure portion may be provided. The secure portion 702 may be configured to generate a homomorphically encrypted associated private key, which is transmitted to the non-secure portion. The secure portion 702 may be further configured to generate a homomorphic key pair. Additionally, the secure portion 702 may be also configured to encrypt data, and to generate a homomorphically and attribute based encrypted control key, which are transmitted to the non-secure portion 704. The control key may be decrypted from the homomorphically encrypted associated private key, the homomorphically encrypted and attribute based encrypted control key, and the corresponding private key of the homomorphic key pair. The control key may then be used to decrypt the encrypted data.

The trusted network system 700 may be configured to generate a data key ($K_d$). The trusted network system 700 may be configured to generate an encrypted data key ($E_{Kc}(K_d)$), the encrypted data key ($E_{Kc}(K_d)$) configured to be decrypted by the control key ($K_c$). The encrypted data ($E_{Kd}(Data)$) may be configured to be decrypted by the data key ($K_d$) so that the encrypted data ($E_{Kd}(Data)$) is configured to be indirectly decrypted based on the control key ($K_c$).

The network system 700 may be configured to transmit the encrypted data key from the trusted network 702 to the non-trusted network 704.

The trusted network 702 may include a cryptography agnostic key management (CAKM) administration tool module. The trusted network 702 may further include a ciphertext policy attribute-based encryption (CP-ABE) library module. The trusted network 702 may also include a homographic encryption (HE) module. The trusted network 702 may also include a data owner tool module.

The ciphertext policy attribute-based encryption (CP-ABE) library module may be configured to, on a request from the cryptography agnostic key management (CAKM) administration tool module, generate the associated private key ($K_{abe}$) based on the attribute associated with the user. The ciphertext policy attribute-based encryption (CP-ABE) library module may be configured to, on a request from the data owner tool module, generate the attribute based encrypted control key based on the control key, via attribute based encryption based on the attribute associated with the user.

The homographic encryption (HE) module of the trusted network 702 may be configured to, on a request from the cryptography agnostic key management administration (CAKM) tool module, configured to generate the homomorphic key pair ($K_{pub}$, $K_{priv}$). The homographic encryption module (HE) of the trusted network 702 may be configured to, on a further request from the cryptography agnostic key management administration (CAKM) tool module, configured to generate the homomorphically encrypted associated private key ($HE_{Kpub}(K_{abe})$), based on the associated private key ($K_{abe}$), via homomorphic encryption. The homographic encryption (HE) module of the trusted network 702 may be configured to, on a request from the data owner tool module, generate the homomorphically and attribute based encrypted control key ($HE_{Kpub}(ABE(K_c))$), based on the attribute based encrypted control key, via homomorphic encryption.

The non-trusted network 704 may include a cryptography agnostic key management (CAKM) broker module. The non-trusted network 704 may further include a compute node module. The non-trusted network 704 may also include a data store module.

The non-trusted network 704 may additionally include a homographic encryption (HE) module. The non-trusted network 704 may also include an encrypted key store module.

The homomorphically encrypted associated private key ($HE_{Kpub}(K_{abe})$) may be transmitted to the cryptography agnostic key management broker (CAKM) module. In various embodiments, the homomorphic key pair ($K_{pub}$, $K_{priv}$) may be transmitted to the compute node module. In various other embodiments, a further homomorphic key pair identical to the homomorphic key pair ($K_{pub}$, $K_{priv}$) may be generated in the compute node module.

The encrypted data ($E_{Kd}(Data)$) may be transmitted to the data store module. The encrypted data key ($E_{Kc}(K_d)$) may also be transmitted to the data store module. The homomorphically and attribute based encrypted control key ($HE_{Kpub}(ABE(K_c))$) may be transmitted to the cryptography agnostic key management (CAKM) broker module.

Based on the request from the user, the homomorphic encryption (HE) module of the non-trusted network 704 may be configured to generate a homomorphically encrypted control key ($HE_{Kpub}(K_c)$) based on the homomorphically encrypted associated private key ($HE_{Kpub}(K_{abe})$), and the homomorphically encrypted and attribute based encrypted control key ($HE_{Kpub}(ABE(K_c))$). The compute node may be further configured to generate the control key ($K_c$) based on the homomorphically encrypted control key ($HE_{Kpub}(K_c)$) generated by the homomorphic encryption module of the non-trusted network and the corresponding private key ($K_{priv}$) of the homomorphic key pair ($K_{pub}$, $K_{priv}$).

In various embodiments, during initialization, the CAKM Administrator may create a set of private keys of an attribute-based encryption for each application user. The private keys may be then encrypted using a homomorphic encryption scheme. The ABE keys may be sent to the CAKM Broker for storage and distribution. The key pair used for homomorphic encryption may be then sent securely to the compute node.

In various embodiments, during encryption, before the Data Owner uploads a file, the Data Owner may generate two random numbers, DataKey and KeyEncKey. DataKey may be used to encrypt the file to be uploaded, KeyEncKey may be used to encrypt the DataKey. Both the encrypted Data and DataKey may be uploaded to the Data Store in the public cloud. The KeyEncKey may be encrypted using a homomorphic encryption scheme and then uploaded to the CAKM Broker for storage and distribution.

In various embodiments, during decryption, when the Compute Node is required to process data, the Compute Node may get the encrypted Data and the DataKey from the DataStore. The Compute Node may also generate a public-private key pair. The Compute Node may request for the KeyEncKey from the CAKM Broker by sending the appropriate authentication credentials and a public key. The CAKM Broker may decrypt the KeyEncKey using homomorphic decryption and may output KeyEncKey encrypted with the Compute Node's public key. The CAKM Broker may send the encrypted KeyEncKey to the Compute Node, which then decrypts it using the stored private key. The KeyEncKey may be used to decrypt the DataKey which may then be used to decrypt the actual Data.

The Key Distribution and Storage of CAKM may make use of the flexibility, scalability, cost-effectiveness, and accessibility advantages of Public Cloud. Various embodiments may provide improved security because there is no need to trust a third party SecaaS (Security-as-a-Service) offerings or the CSP (Cloud Service Providers). Various embodiments may provide improved performance and security because the Key Manager and Compute Nodes can be deployed in a "virtual private cloud" environment (close proximity and controlled application environment). Attribute-based Encryption may allow data owners to share the data to other users without the cloud service provider knowing anything about the data.

In various embodiments, a "circuit" may be understood as any kind of a logic implementing entity, which may be special purpose circuitry or a processor executing software stored in a memory, firmware, or any combination thereof. Thus, in various embodiments, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail herein may also be understood as a "circuit" in accordance with an alternative embodiment.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of encrypting data in a network system, the method comprising:
   generating within a trusted network of the network system an associated private key based on an attribute associated with an user;
   generating within the trusted network a homomorphically encrypted associated private key based on the associated private key via homomorphic encryption;
   generating within the trusted network a homomorphic key pair comprising a public key and a corresponding private key paired with the public key;
   transmitting the homomorphically encrypted associated private key from the trusted network to a non-trusted network of the network system;
   generating within the trusted network encrypted data based on said data;
   generating within the trusted network a control key;
   generating within the trusted network an attribute based encrypted control key based on the control key, via attribute based encryption based on the attribute associated with the user;
   generating within the trusted network a homomorphically and attribute based encrypted control key based on the attribute based encrypted control key, via homomorphic encryption; and
   transmitting the encrypted data, and the homomorphically and attribute based encrypted control key, from the trusted network to the non-trusted network;
   wherein the encrypted data is configured to be decrypted based on the control key; and
   wherein based on a request from the user, the control key is generated within the non-trusted network based on the homomorphically encrypted associated private key, the homomorphically encrypted and attribute based encrypted control key, and the corresponding private key of the homomorphic key pair.

2. The method according to claim 1, further comprising:
   generating within the trusted network a data key; and
   generating within the trusted network an encrypted data key, the encrypted data key configured to be decrypted by the control key;
   wherein the encrypted data is configured to be decrypted by the data key so that the encrypted data is configured to be indirectly decrypted based on the control key.

3. The method according to claim 2, further comprising:
   transmitting the encrypted data key from the trusted network to the non-trusted network.

4. The method according to claim 1,
   wherein the homomorphic encryption is a fully homomorphic encryption.

5. The method according to claim 1,
   wherein the non-trusted network, upon request from a data owner, is configured to delete the homomorphically and attribute based encrypted control key.

6. The method according to claim 2,
   wherein the trusted network, upon request from a data owner, is configured to obtain the homomorphically and attribute based encrypted control key, and encrypted data key, from the non-trusted network.

7. The method according to claim 6,
wherein the trusted network is further configured to decrypt the control key based on the homomorphically and attribute based encrypted control key; and further configured to decrypt the data key based on the encrypted data key, via the control key.

8. The method according to claim 7,
wherein the trusted network is further configured to generate a new control key different from the control key; and further configured to generate a new encrypted data key, the new encrypted data key configured to be decrypted by the new control key.

9. The method according to claim 8,
wherein the trusted network is further configured to generate a new attribute based encrypted control key based on the new control key, via attribute based encryption based on the attribute associated with the user;
wherein the trusted network is further configured to generate a new homomorphically and attribute based encrypted control key, based on the new attribute based encrypted control key, via homomorphic encryption.

10. The method according to claim 9,
wherein the trusted network is further configured to transmit the new homomorphically and attribute based encrypted control key, and the new encrypted data key, to the non-trusted network.

11. A method of decrypting encrypted data in a network system, the method comprising:
generating a control key within a non-trusted network based on a homomorphically encrypted associated private key, a homomorphically encrypted and attribute based encrypted control key, and a corresponding private key of a homomorphic key pair; and
decrypting encrypted data based on the control key;
wherein the homomorphically encrypted associated private key is generated within a trusted network of the network system based on an associated private key via homomorphic encryption, the associated private key generated based on an attribute associated with an user;
wherein the homomorphic key pair comprising a public key and the corresponding private key is generated by the trusted network;
wherein the homomorphically encrypted associated private key is transmitted from the trusted network to the non-trusted network of the network system;
wherein the encrypted data is generated within the trusted network based on data;
wherein the homomorphically encrypted and attribute based encrypted control key is generated based on an attribute based encrypted control key via homomorphic encryption, the attribute based encrypted control key is generated based on a control key generated within the trusted network, via the attribute associated with the user;
wherein the encrypted data, and the homomorphically and attribute based encrypted control key, are transmitted from the trusted network to the non-trusted network.

12. A network system comprising:
a trusted network; and
a non-trusted network connected to the trusted network;
wherein the trusted network is configured to generate an associated private key based on an attribute associated with an user;
wherein the trusted network is configured to generate a homomorphically encrypted associated private key based on the associated private key via homomorphic encryption;
wherein the trusted network is further configured to generate a homomorphic key pair comprising a public key and a corresponding private key paired with the public key;
wherein the trusted network is configured to transmit the homomorphically encrypted associated private key to the non-trusted network;
wherein the trusted network is configured to generate encrypted data based on data;
wherein the trusted network is configured to generate a control key;
wherein the trusted network is configured to generate within the trusted network an attribute based encrypted control key, based on the control key via attribute based encryption, based on the attribute associated with the user;
wherein the trusted network is configured to generate a homomorphically and attribute based encrypted control key, based on the attribute based encrypted control key, via homomorphic encryption;
wherein the trusted network is configured to transmit the encrypted data, and the homomorphically and attribute based encrypted control key, to the non-trusted network;
wherein the encrypted data is configured to be decrypted based on the control key; and
wherein based on a request from the user, the non-trusted network is configured to generate the control key based on the homomorphically encrypted associated private key, the homomorphically encrypted and attribute based encrypted control key, and the corresponding private key of the homomorphic key pair.

13. The network system according to claim 12,
wherein the trusted network system is configured to generate a data key;
wherein the trusted network system is configured to generate an encrypted data key, the encrypted data key configured to be decrypted by the control key;
wherein the encrypted data is configured to be decrypted by the data key so that the encrypted data is configured to be indirectly decrypted based on the control key; and
wherein the network system is configured to transmit the encrypted data key from the trusted network to the non-trusted network.

14. The network system according to claim 12,
wherein the trusted network comprises:
a cryptography agnostic key management (CAKM) administration tool module;
a ciphertext policy attribute-based encryption (CP-ABE) library module;
a homographic encryption (HE) module; and
a data owner tool module.

15. The network system according to claim 14,
wherein the ciphertext policy attribute-based encryption library module is configured to, on a request from the cryptography agnostic key management administration tool module, generate the associated private key based on the attribute associated with the user; and
wherein the ciphertext policy attribute-based encryption library module is configured to, on a request from the data owner tool module, generate the attribute based encrypted control key based on the control key, via attribute based encryption based on the attribute associated with the user.

16. The network system according to claim 14,
wherein the homographic encryption module of the trusted network is configured to, on a request from the cryptography agnostic key management administration tool module, configured to generate the homomorphic key pair;
wherein the homographic encryption module of the trusted network is configured to, on a further request from the cryptography agnostic key management administration tool module, configured to generate the homomorphically encrypted associated private key, based on the first private key, via homomorphic encryption; and
wherein the homographic encryption module of the trusted network is configured to, on a request from the data owner tool module, generate the homomorphically and attribute based encrypted control key, based on the attribute based encrypted control key, via homomorphic encryption.

17. The network system according to claim 12,
wherein the non-trusted network comprises:
a cryptography agnostic key management (CAKM) broker module;
a compute node module;
a data store module;
a homographic encryption module; and
an encrypted key store module.

18. The network system according to claim 17,
wherein the homomorphically encrypted associated private key is transmitted to the cryptography agnostic key management broker module, and the homomorphic key pair is transmitted to the compute node module.

19. The network system according to claim 17,
wherein the encrypted data is transmitted to the data store module, and the homomorphically and attribute based encrypted control key is transmitted to the cryptography agnostic key management broker module.

20. The network system according to claim 17,
wherein based on the request from the user, the homomorphic encryption module of the non-trusted network is configured to generate a homomorphically encrypted control key based on the homomorphically encrypted associated private key, and the homomorphically encrypted and attribute based encrypted control key; and
wherein the compute node is further configured to generate the control key based on the homomorphically encrypted control key generated by the homomorphic encryption module of the non-trusted network and the corresponding private key of the homomorphic key pair.

* * * * *